(12) United States Patent
Kimura et al.

(10) Patent No.: US 7,996,665 B2
(45) Date of Patent: Aug. 9, 2011

(54) INFORMATION PROCESSING DEVICE, POWER SUPPLY CONTROL METHOD AND STORAGE MEDIUM

(75) Inventors: Masatoshi Kimura, Kawasaki (JP);
Kazuhiro Takeda, Kawasaki (JP);
Yasuhiro Mikasa, Kawasaki (JP);
Hiroyuki Komai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1084 days.

(21) Appl. No.: 11/692,684

(22) Filed: Mar. 28, 2007

(65) Prior Publication Data

US 2007/0234093 A1 Oct. 4, 2007

Related U.S. Application Data

(63) Continuation-in-part of application No. 11/460,718, filed on Jul. 28, 2006, now abandoned.

(30) Foreign Application Priority Data

Mar. 29, 2006 (JP) ................................. 2006-092516
Dec. 26, 2006 (JP) ................................. 2006-350706

(51) Int. Cl.
*G06F 9/00* (2006.01)
*G06F 15/177* (2006.01)

(52) U.S. Cl. ................ 713/2; 713/1; 713/300; 713/310; 713/320; 713/324

(58) Field of Classification Search .................. 713/1, 2, 713/300, 310, 320, 324
See application file for complete search history.

(56) References Cited

U.S. PATENT DOCUMENTS

| | | | |
|---|---|---|---|
| 6,202,212 | B1 | 3/2001 | Sturgeon et al. |
| 7,017,052 | B2* | 3/2006 | Aklilu et al. ................... 713/300 |
| 7,114,090 | B2* | 9/2006 | Kardach et al. ............... 713/323 |
| 7,188,239 | B2 | 3/2007 | Funayama |
| 7,240,228 | B2* | 7/2007 | Bear et al. ..................... 713/320 |
| 7,321,974 | B2* | 1/2008 | Anderson et al. ............. 713/320 |
| 7,426,647 | B2* | 9/2008 | Fleck et al. ................... 713/320 |
| 7,500,127 | B2* | 3/2009 | Fleck et al. ................... 713/324 |
| 7,506,141 | B2* | 3/2009 | Guo et al. ......................... 713/1 |
| 7,567,357 | B2 | 7/2009 | Kato et al. |
| 2001/0039612 | A1* | 11/2001 | Lee ................................. 713/2 |
| 2003/0051126 | A1* | 3/2003 | Numano et al. ................... 713/1 |

(Continued)

FOREIGN PATENT DOCUMENTS

CN 1746816 A 3/2006

(Continued)

OTHER PUBLICATIONS

Office Action issued in corresponding Korean Patent Application No. 10-2007-0029231, mailed on Mar. 15, 2008.

(Continued)

*Primary Examiner* — Thomas Lee
*Assistant Examiner* — Jaweed A Abbaszadeh
(74) *Attorney, Agent, or Firm* — Fujitsu Patent Center

(57) ABSTRACT

An information processing device includes: a power-off detection unit for detecting a signal relating to a power-off operation of a user; an application program termination unit for terminating a predetermined application program when the power-off operation is performed; and a control unit for passing control, after the termination of the application program, to a state in which normal execution can be started faster than normal power-off, and power consumption is lower than in the normal execution.

8 Claims, 12 Drawing Sheets

U.S. PATENT DOCUMENTS

| | | | |
|---|---|---|---|
| 2003/0097598 A1* | 5/2003 | Aklilu et al. | 713/300 |
| 2004/0123315 A1* | 6/2004 | Na | 725/37 |
| 2004/0225901 A1* | 11/2004 | Bear et al. | 713/300 |
| 2005/0044427 A1* | 2/2005 | Dunstan et al. | 713/300 |
| 2005/0071692 A1* | 3/2005 | Chaiken et al. | 713/300 |
| 2005/0076256 A1* | 4/2005 | Fleck et al. | 713/320 |
| 2005/0102540 A1* | 5/2005 | Kim et al. | 713/300 |
| 2005/0160255 A1* | 7/2005 | Obitsu et al. | 713/1 |
| 2005/0182978 A1* | 8/2005 | Anderson et al. | 713/300 |
| 2006/0059380 A1* | 3/2006 | Kimura | 713/323 |
| 2006/0123258 A1* | 6/2006 | Westerinen et al. | 713/300 |
| 2006/0156047 A1* | 7/2006 | Ito et al. | 713/310 |
| 2007/0061558 A1* | 3/2007 | Rothman et al. | 713/1 |
| 2008/0031588 A1* | 2/2008 | Leung et al. | 386/83 |

FOREIGN PATENT DOCUMENTS

| | | |
|---|---|---|
| JP | 05-46408 A | 2/1993 |
| JP | 07-271561 | 10/1995 |
| JP | 10-293619 | 11/1998 |
| JP | 10-320094 | 12/1998 |
| JP | 11-353048 | 12/1999 |
| JP | 2001-5547 A | 1/2001 |
| JP | 2002-207539 A | 7/2002 |
| JP | 2005-35255 A | 2/2005 |
| WO | WO 02/095556 | 11/2002 |

OTHER PUBLICATIONS

Chinese Office Action issued on Apr. 10, 2009 in corresponding Chinese Patent Application 200710091333x.

Chinese Office Action issued Feb. 5, 2010 in corresponding Chinese Patent Application 200710091333.X.

"Japanese Office Action" mailed by JPO and corresponding to Japanese application No. 2006-350706 on Apr. 12, 2011, with English translation.

* cited by examiner

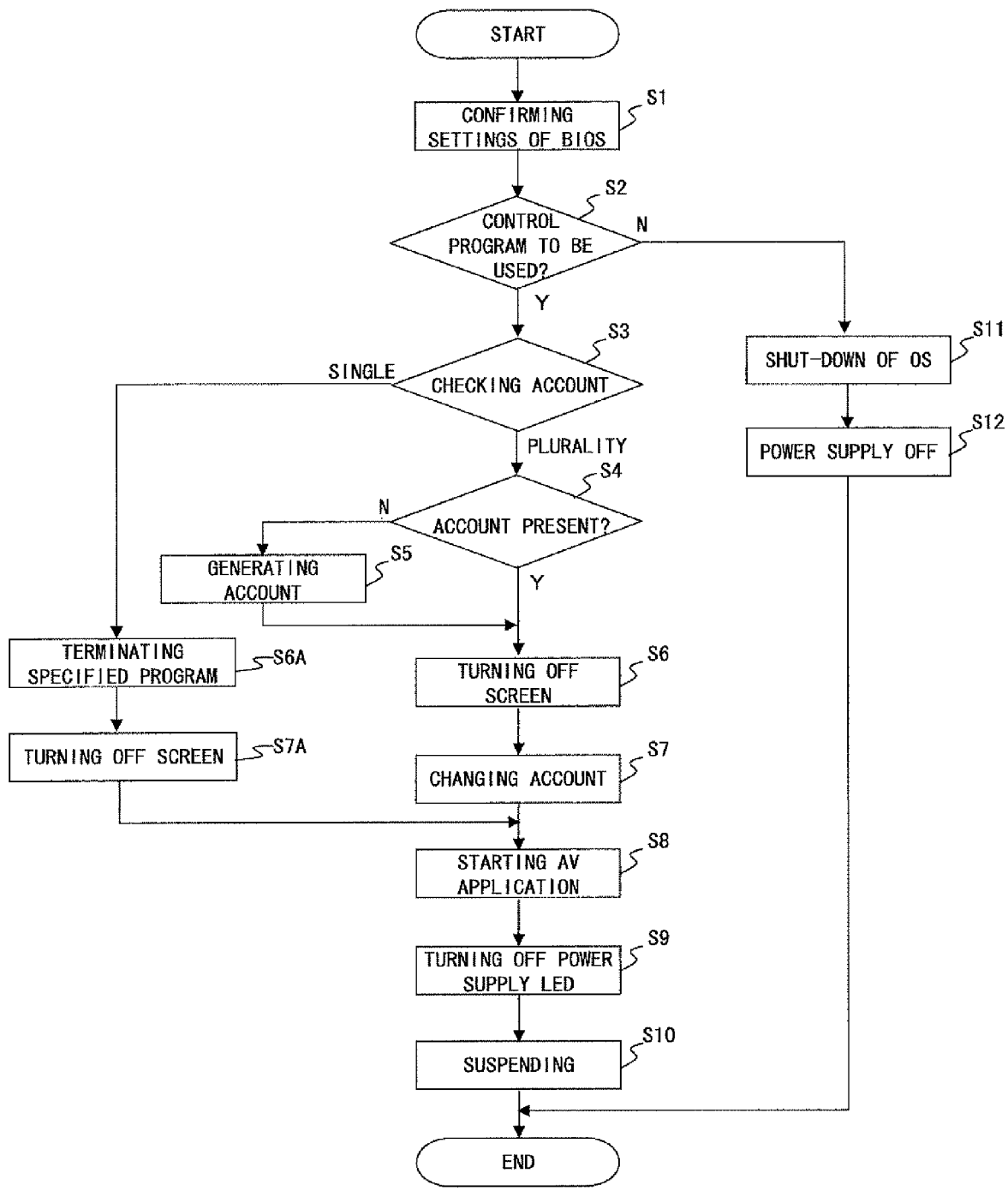
F I G. 2

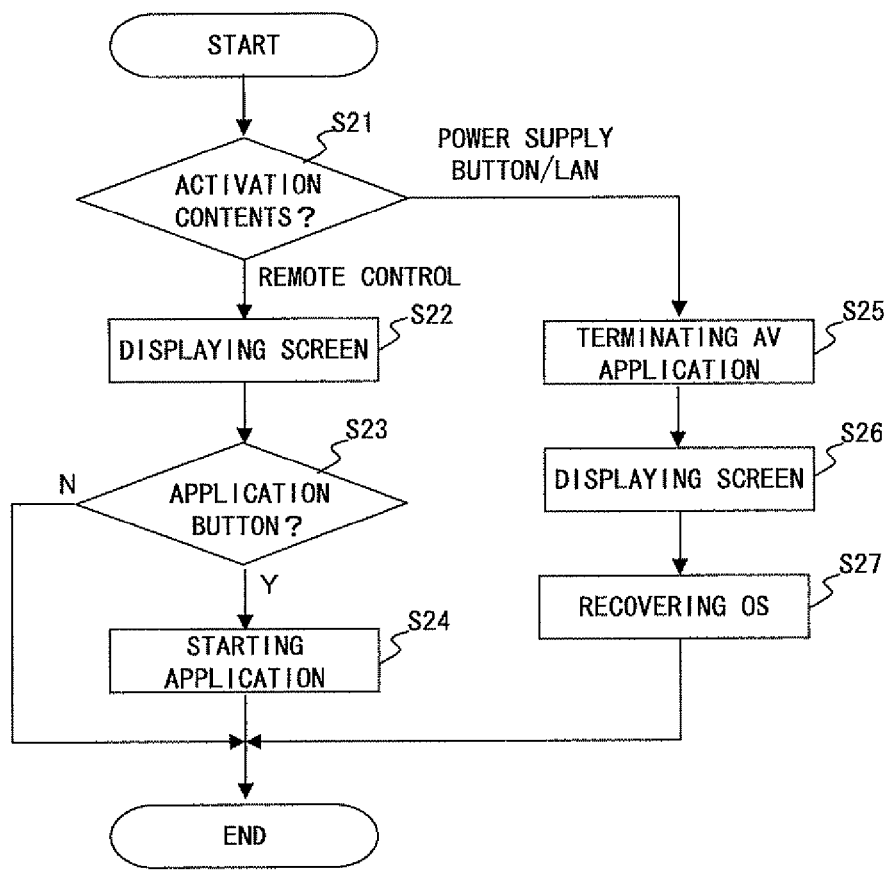
F I G. 3

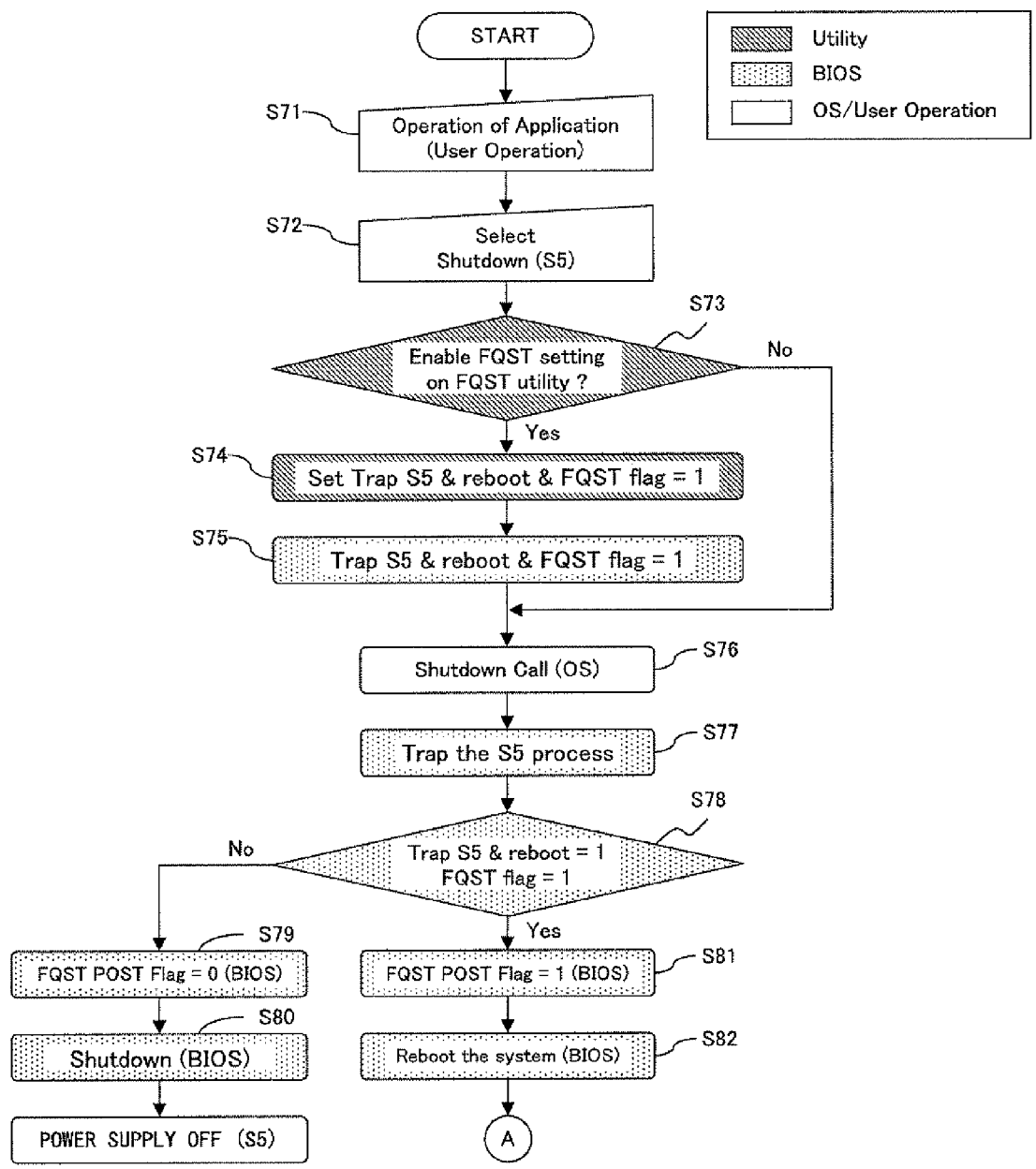
F I G. 8

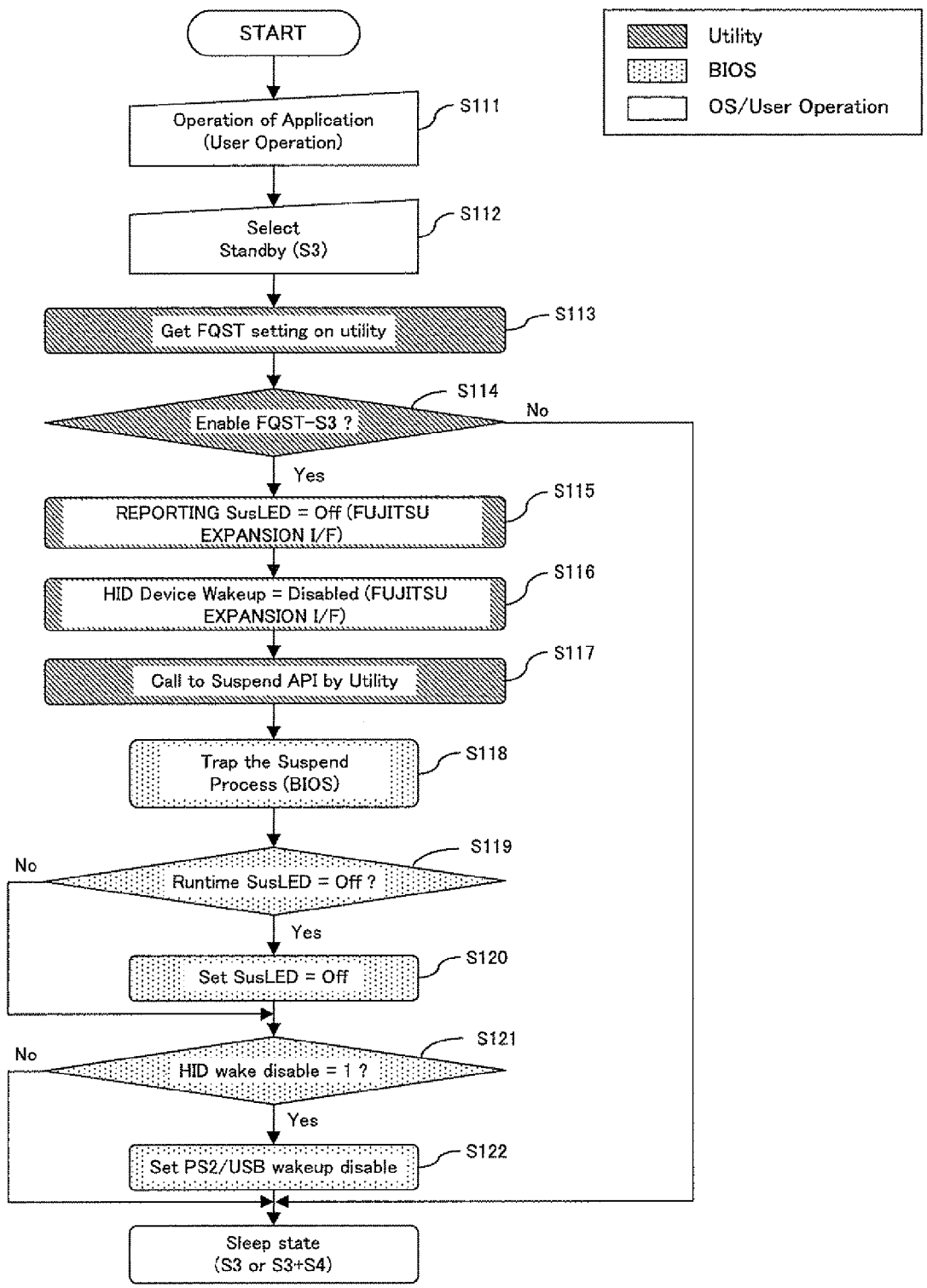
F I G. 1 0

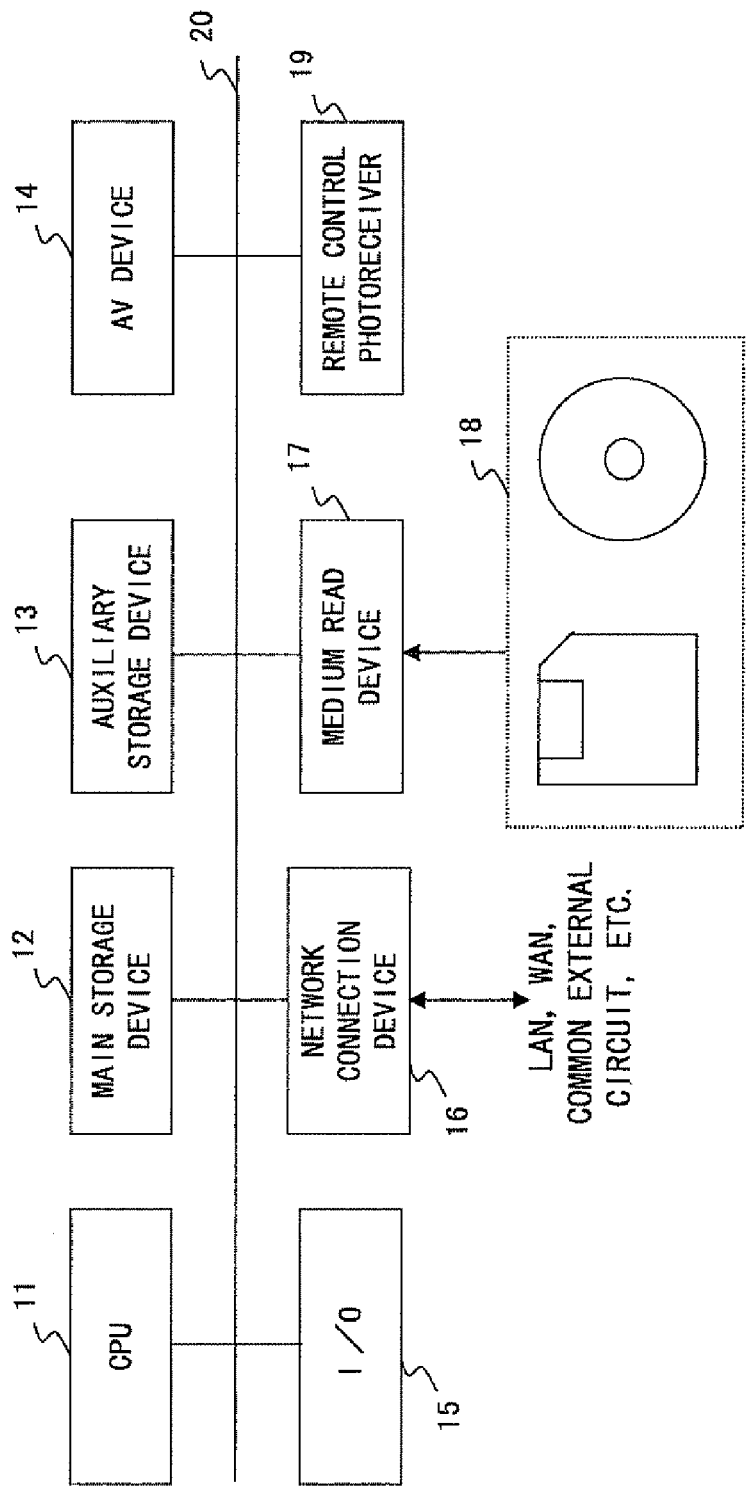
F I G. 11

INFORMATION PROCESSING DEVICE, POWER SUPPLY CONTROL METHOD AND STORAGE MEDIUM

CROSS-REFERENCE TO RELATED APPLICATION

This patent application is a continuation in part application of the previous U.S. patent application, titled "INFORMATION PROCESSING DEVICE, POWER SUPPLY CONTROL METHOD AND STORAGE MEDIUM", filed on Jul. 28, 2006, application Ser. No. 11/460,718 now abandoned, and claims priority benefit to Japanese Application No(s) 2006-092516 filed Mar. 29, 2006 and 2006-350706 filed Dec. 26, 2006 all herein incorporated by reference.

BACKGROUND OF THE INVENTION

1. Field of the Invention

The present invention relates to a technique of starting and terminating an information processing device.

2. Description of the Related Art

When an information processing device such as a PC, etc. is once terminated and then restarted, there are various problems such as performing a resume function at the restart, etc. as disclosed by the patent document 1 (Japanese Published Patent Application No. H10-293619) and the patent document 2 (Japanese Published Patent Application No. H7-271561).

Relating to these problems, the restart time from power-up is very important for an information processing device that has been widely used as AV equipment loaded with a television tuner, etc. When the information processing device is used as AV equipment, it is necessary, as with ordinary AV equipment, to be available immediately after power-up.

As an information processing device which is loaded with the above-mentioned television tuner and can be used as AV equipment, the patent document 3 (Japanese Published Patent Application No. H10-320094) discloses an information processing device capable of switching between a TV mode in which a user can watch full-screen TV images and a PC mode using Windows.

As described above, it is necessary for an information processing device, which is loaded with a television tuner, etc., and can be used as AV equipment, to be able to start in a short time as common AV equipment at power-up.

To solve the above-mentioned problem, there has been a method of loading an information processing device with an OS for integration in addition to an OS for using the device as a PC, starting the information processing device by the OS for integration when the device is used as AV equipment after power-up, thereby quickly starting the device.

However, with the configuration of loading the information processing device with two OS's, the entire device is expensive, and each OS requires an application program to be individually developed. Thus, excess development is required. Additionally, it is a laborious process to use a PC and AV equipment in cooperation, and it is also difficult to unify the application programs to be used.

SUMMARY OF THE INVENTION

To solve the above-mentioned problems, the present invention aims at providing an information processing device and a program capable of starting the device within a short time without loading it with two OS's.

To attain the above-mentioned objective, the information processing device according to the present invention includes a power-off detection unit, an application program termination unit, and a control unit.

The power-off detection unit detects a signal relating to the power-off operation of a user.

The application program termination unit terminates a predetermined application program when the power-off operation is performed.

After the termination of the application program, the control unit passes control to a state in which the normal execution can be started faster than the normal power-off, and the power consumption can be lower than in the normal execution.

With the above-mentioned configuration, the application program with which the information processing device is started faster than the normal power-off and the power consumption is lower than in the normal execution terminates.

The control unit can be constituted to further include an application program activation unit for starting a predetermined application program before passing control to the above-mentioned state.

Thus, when control is returned from the state in which the normal execution can be started faster than the normal power-off, and the power consumption can be lower than in the normal execution, control can be returned to the state in which the predetermined application program is started.

Furthermore, a power supply state indicator can be turned off when control is passed to the above-mentioned state.

With the above-mentioned configuration, the power supply LED can be turned off and the user can recognize it as the shutdown status although the normal execution can be started faster than the normal power-off, and the power consumption can be lower than in the normal execution.

In addition, the control unit can make a correction to perform a normal terminating process when the user performs a power-off operation different from the above-mentioned power-off operation.

With the above-mentioned configuration, the contents of the terminating process can be changed depending on the method of the power-off operation performed by a user.

The information processing device according to the present invention available using a plurality of accounts can also be constituted by including: a power-off detection unit for detecting a signal relating to the power-off operation of a user; an account change processing unit for stopping the use by an account of the user when the power-off operation is performed, and making a change to the use by an account for a high-speed start; and a control unit for passing control to a state in which the normal execution can be started faster than the normal power-off, and the power consumption can be lower than in the normal execution after the termination of the application program.

The present invention includes in its scope the power supply control method and program for use with the information processing device.

According to the present invention, the device can be started in a show time without loading it with two OS's.

When entering a suspended state, a started application program is terminated. Therefore, although the user turns off or pull the plug of the body of the information processing device by mistakenly recognizing that the OS has been shut down, the device can be restarted without problems.

BRIEF DESCRIPTION OF THE DRAWINGS

FIG. 2 is a flowchart of the operations of the information processing device performed when the termination is performed by pressing the power supply button of the remote control;

FIG. 3 is a flowchart of the operating process performed when the information processing device returns;

FIG. 8 is a flowchart (1) more practically showing the flowchart shown in FIG. 6;

FIG. 10 is a flowchart more practically showing the flowchart shown in FIG. 7;

FIG. 11 shows an example of the configuration of the information processing device.

DESCRIPTION OF THE PREFERRED EMBODIMENT

A mode for embodying the present invention is explained below by referring to the attached drawings.

It is assumed that the information processing device according to the mode for embodying the present invention is provided with one OS. When a user turns the power supply switch to the OFF position, the OS is not shut down, but the suspended state in which the current is not supplied to the components other than the memory is entered.

At this time, the display screen, etc. is displayed to indicate as if the OS were shut down. Furthermore, all application programs other than the resident activated applications are terminated before entering the suspended state to that there occur no problems although the power supply is shut off by pressing the power supply button. The application programs to be terminated and the application programs not to be terminated are predetermined and stored in the auxiliary storage device, etc.

Thus, since the device can be started from the suspended state when it is activated, a high-speed activation can be realized. Since the application program has been terminated before entering the suspended state, there occur no problems when the device is restarted although the user mistakenly considers that the device is shut down and turn off the body of the information processing device or pulls the plug of the device after entering the suspended state by turning the switch of the remote control to the off position.

Furthermore, since there is only one OS provided for the device, it can be constituted at a lower cost as compared with the case where two OS's are provided. In addition, excess development for an application program is not required, and the cooperation between AV equipment and a PC can be easily performed.

FIG. 1 shows a timing chart showing the operation to be performed when the button of a remote control is pressed in the information processing device according to a mode for embodying the present invention.

Figure 1A:
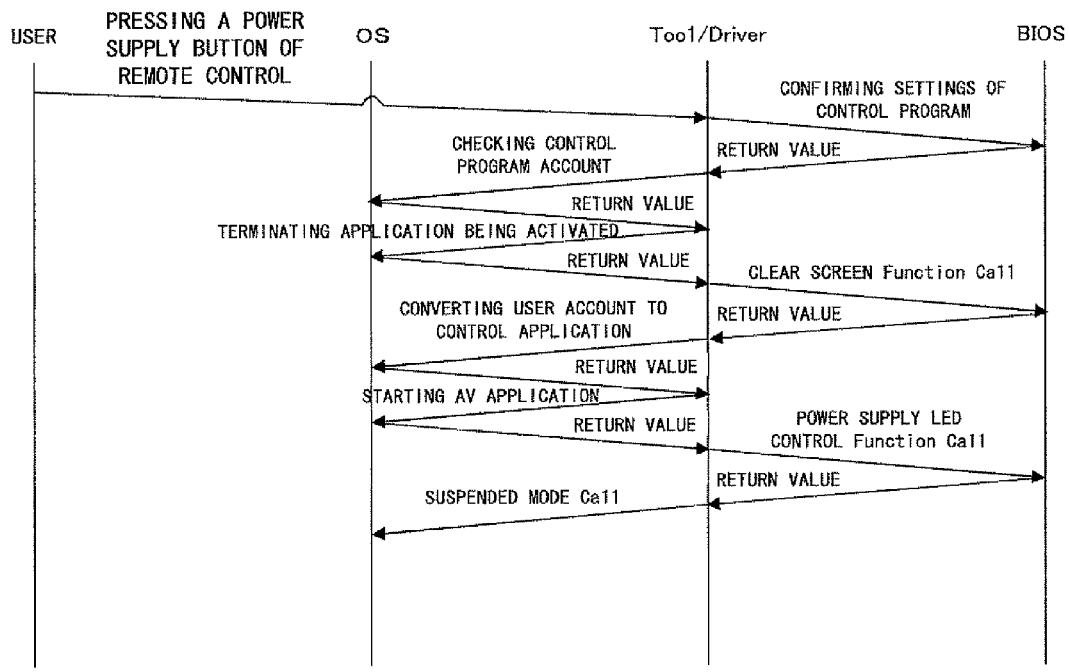
FIGS. 1A and 1B are timing charts showing the operation to be performed when the button of a remote control is pressed in the information processing device according to a mode for embodying the present invention.
Figure 1B:
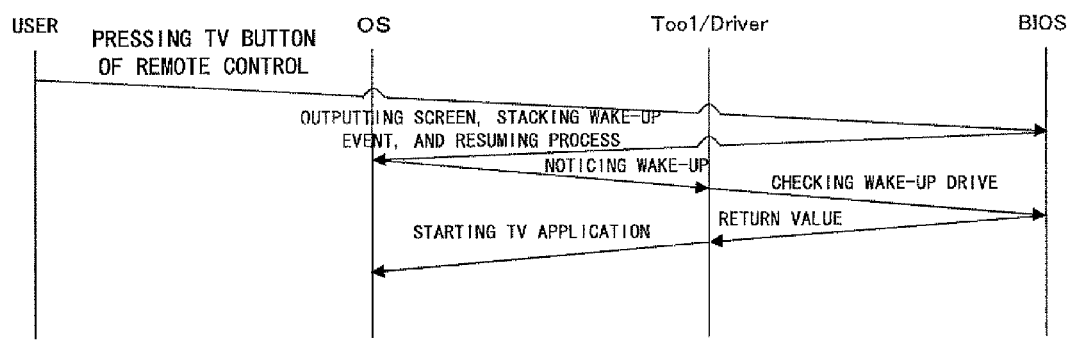

FIG. 1A shows the operation performed when the information processing device is terminated using a power supply switch of a remote control. FIG. 1B shows the operation performed when the TV switch of the remote control is pressed for the information processing device in the suspended state by the operation shown in FIG. 1A.

In FIG. 1A, when the user presses the power supply of the remote control, the power supply control program requests the confirmation of setting the BIOS (basic input output system). If a response value indicates the setting of using the power supply control program, then the power supply control program requests the OS to check the current account name and receives a response.

Then, the power supply control program determines an application to be terminated according to the information stored in the auxiliary storage device from among the currently activated application programs for the OS, issues a command to terminate the determined application, and receives a response. In addition, the program issues a function call to the BIOS to turn off the display screen of the information processing device.

If the information processing device has a plurality of accounts, there is the possibility that the operator who has turned the power supply switch to the on position uses the environment of the account used when the power-off operation is performed. Therefore, the power supply control program instructs the OS to change the account of the current OS which is set as the user account to its own account.

Then, the power supply control program performs control to turn off the power supply LED on the BIOS using the function call. When it terminates it starts the AV application as a starting launcher of the AV application program with the screen turned off, and then controls the OS to enter the suspended mode.

In this state, the information processing device looks to the user as if the OS were shut down, and terminated.

In this state, when the TV button of the remote control is pressed, the event is stacked in the BIOS as shown in FIG. 1B. The BIOS also turns on the display screen, displays the screen of the AV application, returns the OS, and notifies the power supply control program of the event. Thus, the power supply control program recognizes that the TV button of the remote control has been pressed.

Then, the OS notifies the application of the activation of the OS as wake-up. Upon receipt of the notification, the device driver performs an initializing process. The power supply control program asks the BIOS what has started the wakeup device check, and activates the TV application if, as a response, the activation was performed by pressing the TV button of the remote control.

Thus, in the information processing device according to the present mode for embodying the present invention, when the power supply button of the remote control is pressed, it looks as if the shutdown process were performed, thereby entering the suspended state. At this time, all application programs being activated are closed. When the device is restarted, it can be activated from the suspended state.

FIG. 2 is a flowchart of the operating process performed when the information processing device is terminated by pressing the power supply button of the remote control.

The process shown in FIG. 2 is realized by the CPU in the information processing device executing the program stored in the memory.

When the power supply button of the remote control is pressed, the settings of the BIOS are confirmed in step S1.

Based on the result, it is determined whether or not the settings indicate using the power supply control program. If the settings indicate not using the power supply control program (NO in step S2), then the OS is shut down in step S11, and the power supply is OFF in step S12, thereby terminating the present process.

If the settings indicate using the power supply control program in step S2 (YES in step S2), the account of the OS is checked in step S3.

If the OS has a plurality of accounts (plurality of accounts in step S3), and the account of the power supply control program is registered in the OS (YES in step S4), then control is passed to step S6. If the account of the power supply control program is not registered in the OS (NO in step S4), then the account of the power supply control program is generated in the OS in step S5.

Then, in step S6, the display screen of the information processing device is turned off. In step S7, as security means, the account of the current user is changed to the account of the power supply control program.

If the OS has a single account only (single in step S3) then a specific application program to be terminated is determined according to predetermined information, and the terminating process is performed (step S6A). Then, the display screen of the information processing device is turned off (step S7A).

Then, in the state in which the display screen is turned off, the AV application is started (step S8). In step S9, the power supply LED of the information processing device is turned off. Finally, the device enters the suspended state.

In the above-mentioned process, the information processing device is in the suspended state, but looks to the user as if the OS were shut down and the power supply were OFF. Since the activated application program enters the suspended state after the termination, there occur no problems when the device is restarted although the body of the information processing device is turned off or its plug is pulled.

FIG. 3 is a flowchart of the operating process when the information processing device which has terminated in the process shown in the flowchart in FIG. 2 recovers.

The process shown in FIG. 3 is also realized by the CPU of the information processing device executing the program stored in the memory.

When the process shown in FIG. 3 is started, it is checked what instructed the BIOS to start the device in step S21.

As a result, if a start instruction has been issued by a press of a power supply button of the information processing device or a notification through a LAN (power supply button/LAN in step S21), then the AV application terminates in the state in which the display screen of the information processing device is turned off in step S25. The screen is displayed in step S26. The OS recovers in step S27. Then, the present process terminates.

In step S21, if a start instruction is issued by a press of an operation button of the remote control (remote control in step S21), then the turned off display screen of the information processing device is displayed in step S22.

Figure 4:
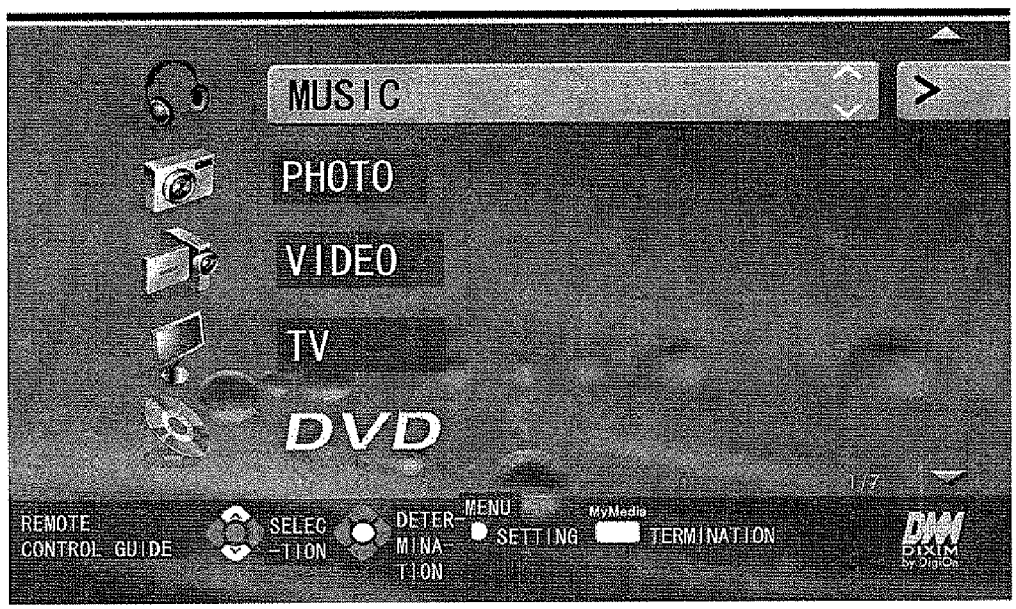
FIG. 4 shows an example of the display screen displayed when the information processing device returns.

FIG. 4 shows a display screen displayed on the information processing device at this time. Since the AV application has been started before the information processing device enters the suspended state, the device displays the display screen of the AV application. Thus, since the information processing device is started in the state in which the AV application as a launcher program of the AV application program is started, the application program such as a TV application, etc. can be started immediately after the application.

In step S23, if the pressed button of the remote control is a button for specification of an application such as a TV button, etc. (YES in step S23), then the application program corresponding to the pressed button is started in step S24, and the process terminates. If the pressed button of the remote control is not the one for specification of an application (NO in step S23), the present process terminates as is.

Thus, according to the information processing device of the mode for embodying the present invention, the device can be started from the suspended state, thereby realizing high speed activation.

In addition, according to the information processing device of the mode for embodying the present invention, the operation of changing to the suspended state in response to the power-off is indicated. However, in addition to the suspended state, the state in which the normal execution can be started faster than the normal power-off, and the power consumption can be lower than in the normal execution can also be entered. For example, the contents of the memory can be recorded in the storage device, and power supply to each component can be terminated. Furthermore, unused equipment, for example, the display device and the storage device can be turned off.

Additionally, in the mode for embodying the present invention, the operation of changing into a suspended state in response to the power-off operation by the remote control is described. However, if the all power supply OFF process is suspended, the operation of the information processing device can be faulty. The power supply OFF operation other than the remote control OFF operation can be normally terminated.

The second mode for embodying the present invention is described below.

In the above-mentioned first mode for embodying the present invention, when a user turns off the power supply switch, the system enters a suspended state with the screen in the OFF state. Therefore, the memory status remains the same as before turning off the power supply switch, and when there occurs a memory leak, the leaked memory cannot be collected.

The second mode for embodying the present invention takes the above-mentioned problem into account.

In the second mode for embodying the present invention, when the power supply switch is turned off, the OS is once shut down and restarted, and the system enters a suspended mode.

Thus, in the second mode for embodying the present invention, the OS is restarted, thereby cleaning the memory, solving the problem of a memory leak and the like, and entering the suspended state.

As a result, if the power supply switch is turned on and the system is activated, then the system can be started in a clean memory state.

Figure 5:
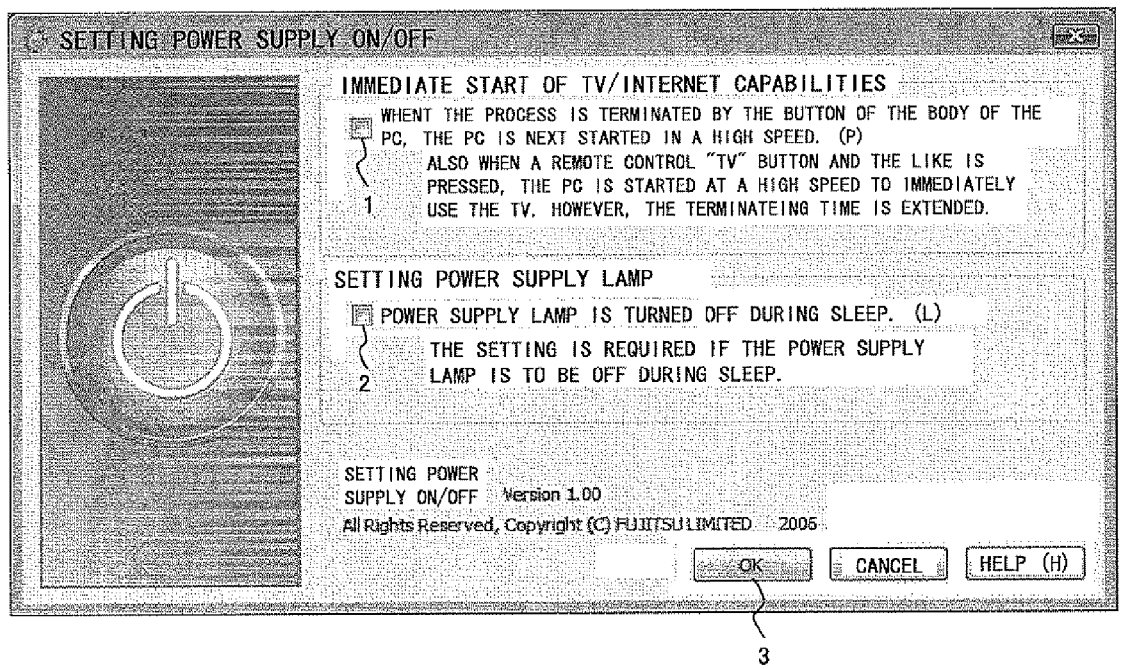
FIG. 5 shows an example of the setting screen for the settings of the second mode for embodying the present invention.

FIG. 5 shows an example of the screen for the settings of the second mode for embodying the present invention.

In FIG. 5, when the check column 1 is checked to perform the above-mentioned second mode for embodying the present invention and an OK button 3 is pressed, the shut down according to the second mode for embodying the present invention is performed when the power supply is in the OFF state. If the check column 1 is checked, the information processing device is activated at a high speed next time after the termination by the button of the body of the information processing device or the remote controller, thereby quickly turning on TV and the like.

If a power supply lamp setting column 2 is checked and the OK button 3 is pressed, a power supply lamp is turned off during sleep (suspend) as described later.

Figure 6:
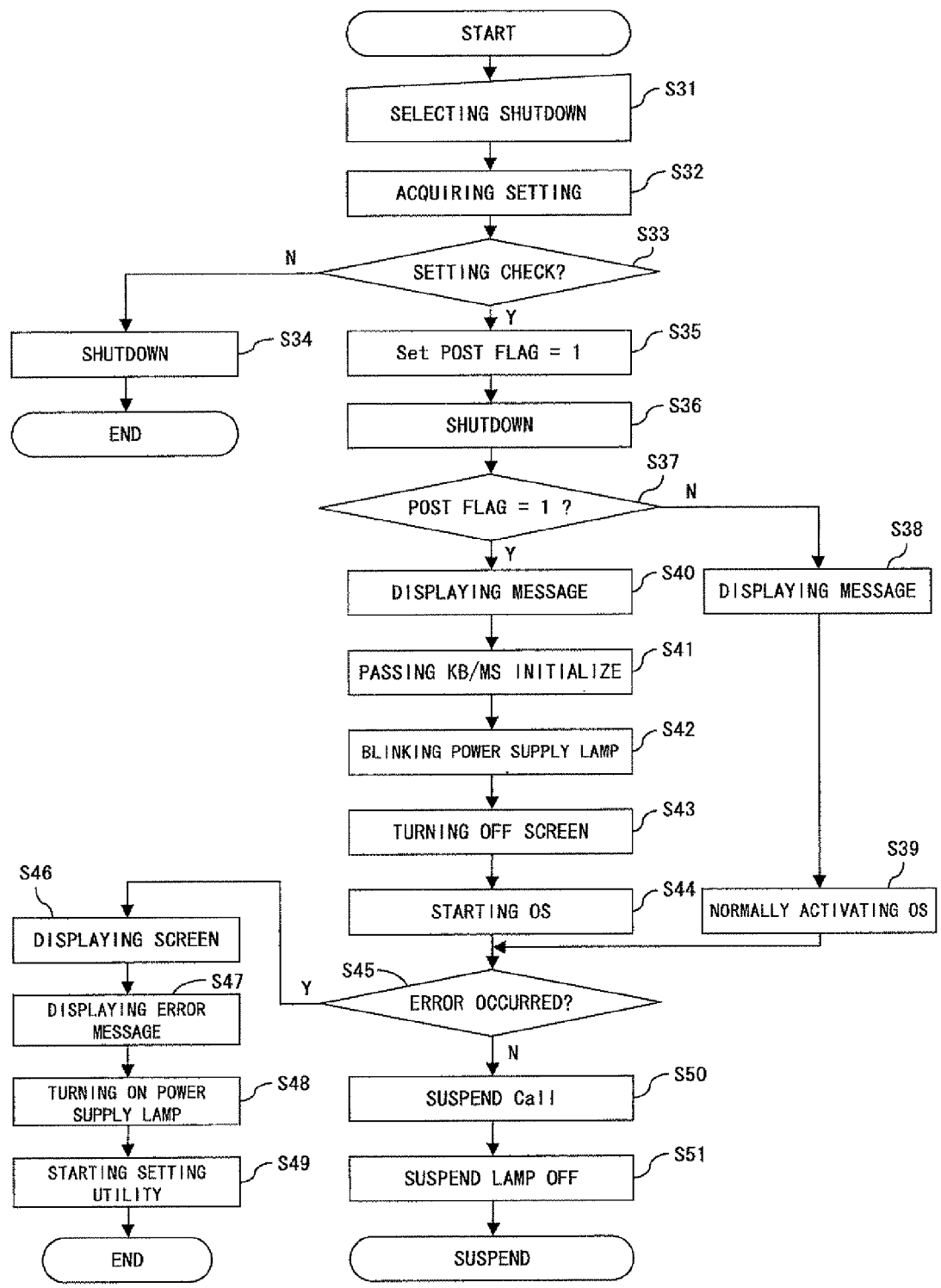
FIG. 6 is a flowchart showing the operation process of the information processing device when it is terminated by pressing the power button according to the second mode for embodying the present invention.

FIG. 6 is a flowchart showing the operation process of the information processing device when it is terminated by pressing the power button according to the second mode for embodying the present invention.

In the process shown in FIG. 6, when a user first presses the power supply switch of the remote controller or the body of the information processing device to turn off the system (step S31), the setting contents set on the setting screen shown in FIG. 5 are acquired in step S32. If the check column 1 has not been checked (NO in step S33), a normal termination process is performed, thereby shutting down the OS in step S34.

If the check column 1 is checked in step S33 (YES in step S33), then the POST FLAG is set to 1 in step S35, and the activated application program is terminated and the OS is shut down in step S36.

Then, the information processing device checks the internal flag POST FLAG setting whether or not the screen display is to be performed when the OS is restarted (step S37). As a result, if the internal flag POST FLAG has not been set to "1" indicating that the calculation screen of the OS is not displayed (NO in step S37), the screen display is placed in the ON position in step S38, the screen display of the activation of the OS is performed, and the OS is normally activated (step S39).

If the internal flag POST FLAG has been set to "1" in step S37 (YES in step S37), a shutdown message such as "Preparation for shutdown. Please wait a moment." is displayed in step S40. In step S41, the calculation by a keyboard or a pointing device is turned off. In step S42, the power supply lamp is turned on, the screen is turned off (step S43), and then the OS is restarted without displaying the activation screen (step S44).

When the OS is restarted in steps S39 and S44, it is checked whether or not an error has occurred before the activating application program is shut down next (step S45). If an error has occurred (YES in step S45), the screen is placed in the displayed state (step S46), and an error message is displayed. After turning on the power supply lamp in step S48, the setting utility is activated in step S49, the screen as shown in FIG. 5 is displayed, thereby terminating the process.

If no error has occurred in step S45, the OS is called for suspend in step S50, the suspend lamp is turned off in step S51, thereby terminating the process. If the OS is set for request to input a password, the system enters the suspended state on the password input screen.

After the process, the shut down information processing device returns if a user issues an activate instruction by pressing the power supply switch of a remote controller or the body of the information processing device, or using a notification through a LAN. The process of the information processing device at this time is the same as the process according to the first mode for embodying the present invention shown in FIG. 3.

Thus, also in the second mode for embodying the present invention as in the first mode for embodying the present invention, the information processing device can be activated in a high speed.

Since the OS is restarted at the termination in the second mode for embodying the present invention, the information processing device can be activated with the problem of the memory leak successfully solved.

The information processing device according to the second mode for embodying the present invention can also be configured to be available by a plurality of accounts. In this case, the information processing device includes, for example: a power-off detection unit for detecting a signal relating to the power-off operation of a user; an account change processing unit for stopping the use by the account of the user when the power-off operation is performed, and changing the account for high-speed activation; and a control unit for entering a status in which the activation can be performed at a higher speed than the normal power-off and the power consumption is lower than in the normal operation after the restart of the OS after the termination of the application program.

Figure 7:
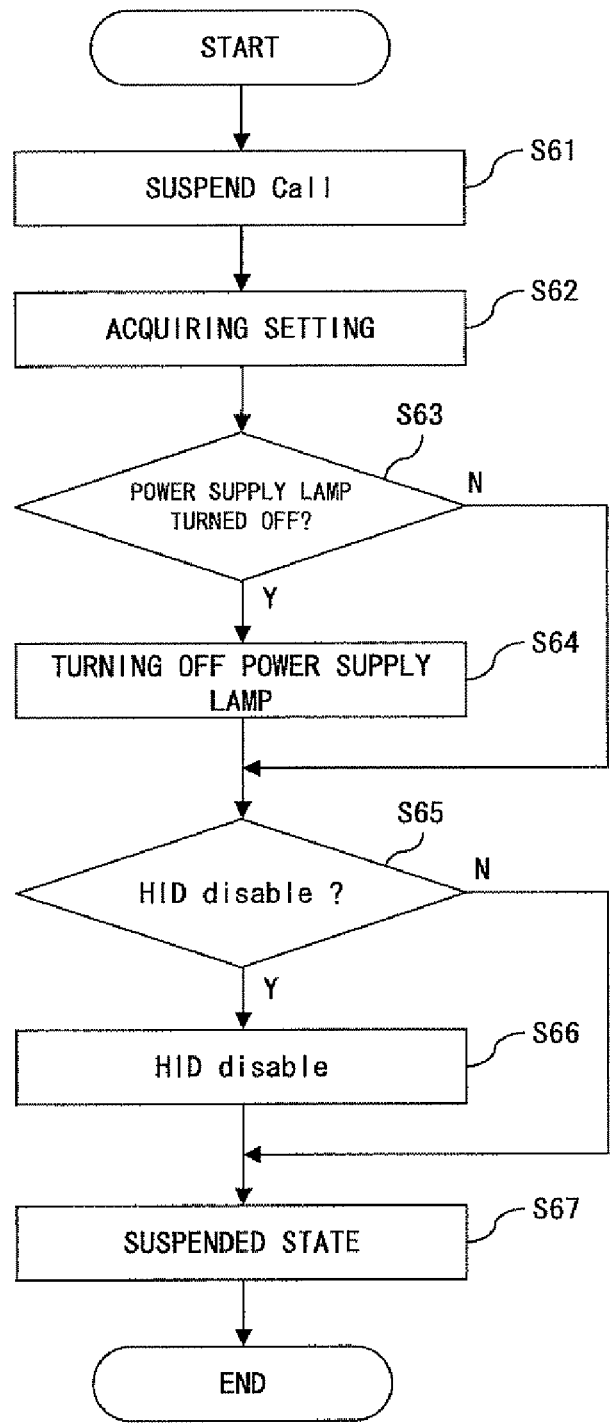
FIG. 7 is a flowchart showing the operation process of the information processing device when the check column shown in FIG. 5 is checked.

FIG. 7 is a flowchart showing the operation process of the information processing device when the check column 2 shown in FIG. 5 is checked.

In FIG. 7, when the process is started, a suspend call is issued in step S61, and the setting contents set on the setting screen as shown in FIG. 5 are acquired in step S62. If the check column 2 is not checked as a result (NO in step S63), the process in step S64 is skipped. If the check column 2 is checked, and an instruction to turn off the power supply lamp has been issued (YES in step S63), the power supply lamp is turned off in step S64.

Then, the internal flag is checked. If an instruction to stop the activation by the operation of the pointing device or the keyboard has not been issued (NO in step S65), then the process in step S66 is skipped. If the internal flag indicates an instruction to stop the activation by the operation of the human interface device (HID) such as a pointing device, a keyboard, etc. (YES in step S65), then the activation by the human interface device is turned off in step S66, and the system enters the suspended state in step S67, thereby terminating the process.

Figure 9:
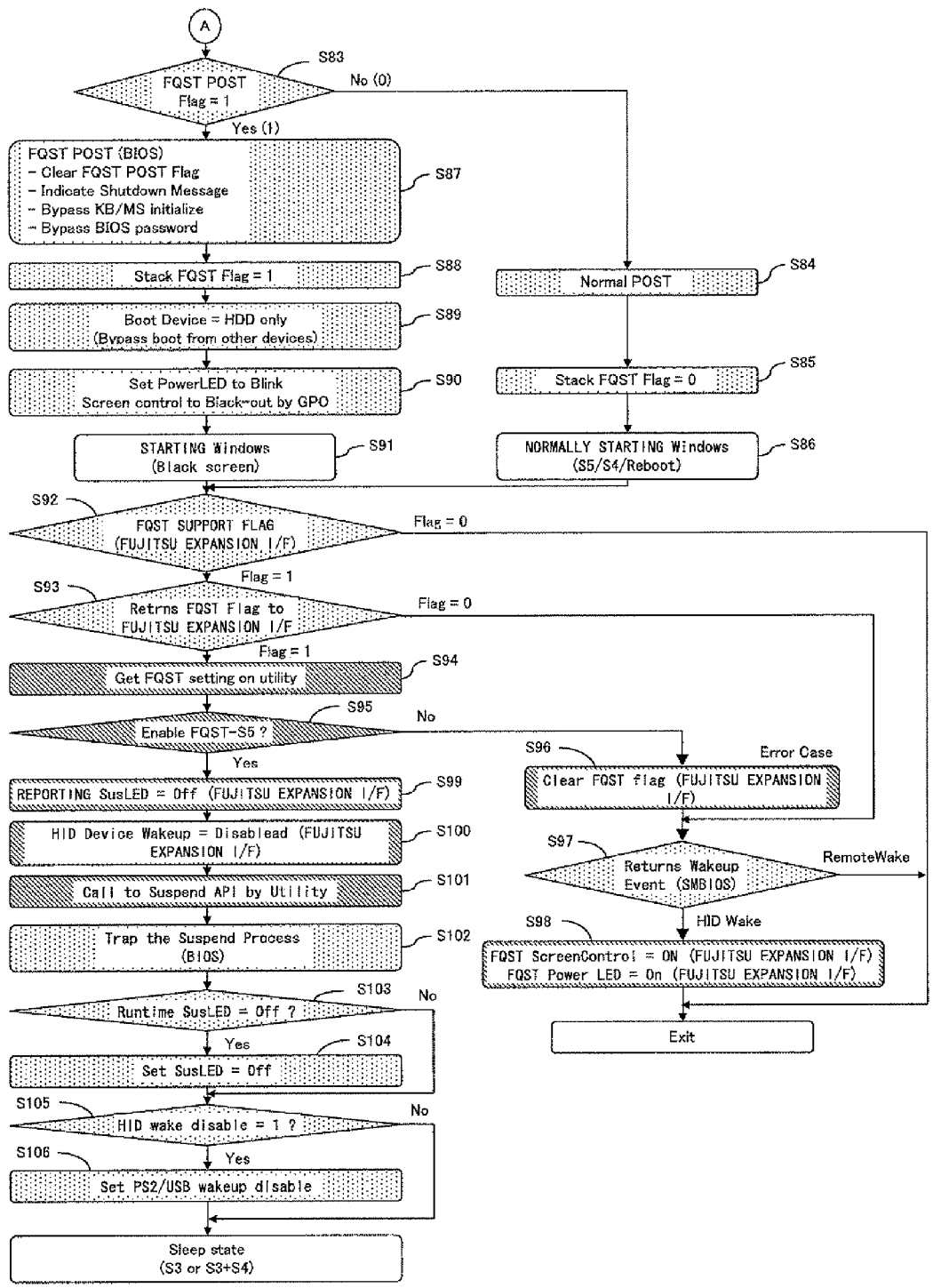
FIG. 9 is a flowchart (2) more practically showing the flowchart shown in FIG. 6.

FIGS. 8 and 9 are flowcharts showing a more practical example than the flowchart shown in FIG. 6. FIGS. 8 and 9 show examples where Windows is used as the OS.

In step S71, when user operates an application (Utility) and shutdown is selected in step S72, it is checked whether or not the process of Enable FQST setting on FQST utility is to be performed (step S73). FQST refers to a setting of an application shown in FIG. 5. If the result is YES (YES in step S73), the application performs Set Trap S5 & reboot & FQST=1 in step S74. In step S75, the BIOS sets Trap S5 & reboot & FQST flag=1. If NO in step S73, then the steps S74 and S75 are skipped.

Then, in step S76, the OS issues Shutdown Call. In step S77, the BIOS performs Trap the S5 process.

Then, it is checked whether or not Trap S5 & reboot=1, and FQST flag=1 (step S78). If the result is NO (NO in step S78), the BIOS sets FQST POST Flag=0 in step S79, shuts down the system (step S80), and enters the power-off state. The FQST POST Flag is a flag indicating the setting contents by an application.

If YES in step S78 (YES in step S78), the BIOS sets FQST POST Flag=1 (step S81), then Reboot the system is performed in step S82.

It is checked whether or not FQST POST Flag=1 (step S83). If the value is 0 (NO in step S83), the BIOS performs Normal POST (step S84), sets Stack FQST flag=0 (step S85), and normally activates Windows (step S86).

If the value is 1 in step S83, the BIOS performs Clear FQST POST Flag, Indicate Shutdown Message, Bypass KB/MS initialize, and Bypass Bios password as FQST POST (step S87). Then, in step S88, the Stack FQST Flag is set to 1. Boot Device=HDD only is set in step S89. In step S90, Set PowerLED to Blink is set, and the Windows is activated (step S91).

Next, the BIOS checks the value of the FQST support flag in step S92. As a result, if the value is 0 (Flag=0 in step S92), then the process terminates. If the value is 1 (Flag=1 in step S92), then the BIOS checks the value of Returns FQST Flag (step S93).

If the resultant value is 0 (Flag=0 in step S93), control is passed to step S97. If the value is 1 (Flag=1 in step S93), then control passed to step S94.

In step S94, the application performs Get FQST setting on utility. If the result is not Enable FQST-S5 (NO in step S95), then Clear FQST flag is performed in step S96. Then, in step S97, the BIOS checks Returns Wakeup Event. If it is RemoteWakeup (RemoteWake in step S97), then the process terminates. If Wakeup by Human Interface Device is detected in step S97 (HID Wake in step 97), then FQST ScreenControl=ON is set in step S98, and FQST Power LED=On is set, and the process terminates.

In step S93, if the value of Flag is 1 (Flag=1 in step S93), the application reports SusLED=Off (step S99), sets HID Device Wakeup=Disabled (step S100) and sets Call to Suspend API (step S101).

Next, the BIOS performs Trap the Suspend Process. If the result is Runtime SusLED=Off (YES in step S103), then the result is Runtime SusLED=Off (YES in step S103), then Set SusLED=OFF in step S104. If the result is not Runtime SusLED=Off (NO in step S103), and step S104 is skipped.

Then, the BIOS checks in step S105 whether or not HID wake disable=1. If it is 1 (YES in step S1105), sets Set PS2/USB wakeup disable in step S106 and the system enters the suspended (sleep) state. If PS2/USB wakeup disable holds, the pointing device and the keyboard are disabled. In step S105, if HID wake disable is not 1 (NO in step S105), step S106 is skipped and the system enters the suspended state. S3 and S4 shown in the figures show the suspended state.

FIG. 10 is a flowchart more practically showing the flowchart shown in FIG. 7.

In step S111, when a user operates an application, and Standby is selected in step S112, the application performs Get FQST setting in step S113. If the result is not Enable FQST-S3 (NO in step S114), then system enters the suspended (sleep) state.

If Enable FQST-S3 holds in step S114 (YES in step S114), then the application reports SusLed=Off (step S115), HID Device Wakeup=Disabled is set (step S116), and Call to Suspend API is performed (step S117).

Next, the BIOS performs Trap the Suspend Process in step S118. If the result is Runtime SusLED=Off (YES in step S119), then Set SusLED=Off is set in step S120. If it is not Runtime SusLED=Off (NO in step S119), then step S120 is skipped.

The BIOS also checks whether or not HID wake disable=1 is set in step S121. If it is set to 1 (YES in step S121), then it performs Set PS2/USB wakeup disable in step S122, and enters the suspended state. In addition, if HID wake disable 1 is not set in step S121, step S122 is skipped and the system enters the suspended state.

Described below is the configuration of the information processing device.

FIG. 11 is a block diagram of the rough configuration of the information processing device according to the mode for embodying the present invention.

The information processing device shown in FIG. 5 has a remote control photoreceiver 19 for receiving a radio directive from a CPU 11, a main storage device 12 such as RAM, etc., an auxiliary storage device 13 such as a hard disk, etc., an AV device 14 such as a TV tuner, etc., an input/output device (I/O) 15, a network connection device 16 such as a modem, etc., a medium read device 17 for reading storage contents from a portable storage medium such as a magnetic tape, etc., and notifying the CPU 11 of the received radio directive. The above-mentioned components are connected via a bus 20. Each component communicates data with each other via the bus 20.

The CPU 11 reads the program on the auxiliary storage device 13 to the main storage device 12 as a resident program, and executes the program using the main storage device 12 as work memory, thereby realizing the process of the flowchart shown in FIGS. 2, 3, 6, 7, 8, 9, and 10.

In the information processing device shown in FIG. 11, a medium read device 26 reads a program and data stored in a storage medium 28 such as a magnetic tape, a flexible disk, CD-ROM, MO, etc., and downloads them into a main storage device 22 or an auxiliary storage device 23. By a CPU 21 executing and using the program and the data, the processes according to the flowcharts shown in FIGS. 2 and 3 can be realized as software.

In the information processing device shown in FIG. 11, application software can be switched using a storage medium 18 such as a flexible disk. Therefore, the present invention is not limited to the information processing device or the method of controlling the start/termination of the device, but can be constituted as a computer-readable storage medium 18 used to direct a computer to perform the function of the mode for embodying the present invention when used by the computer.

Figure 12:
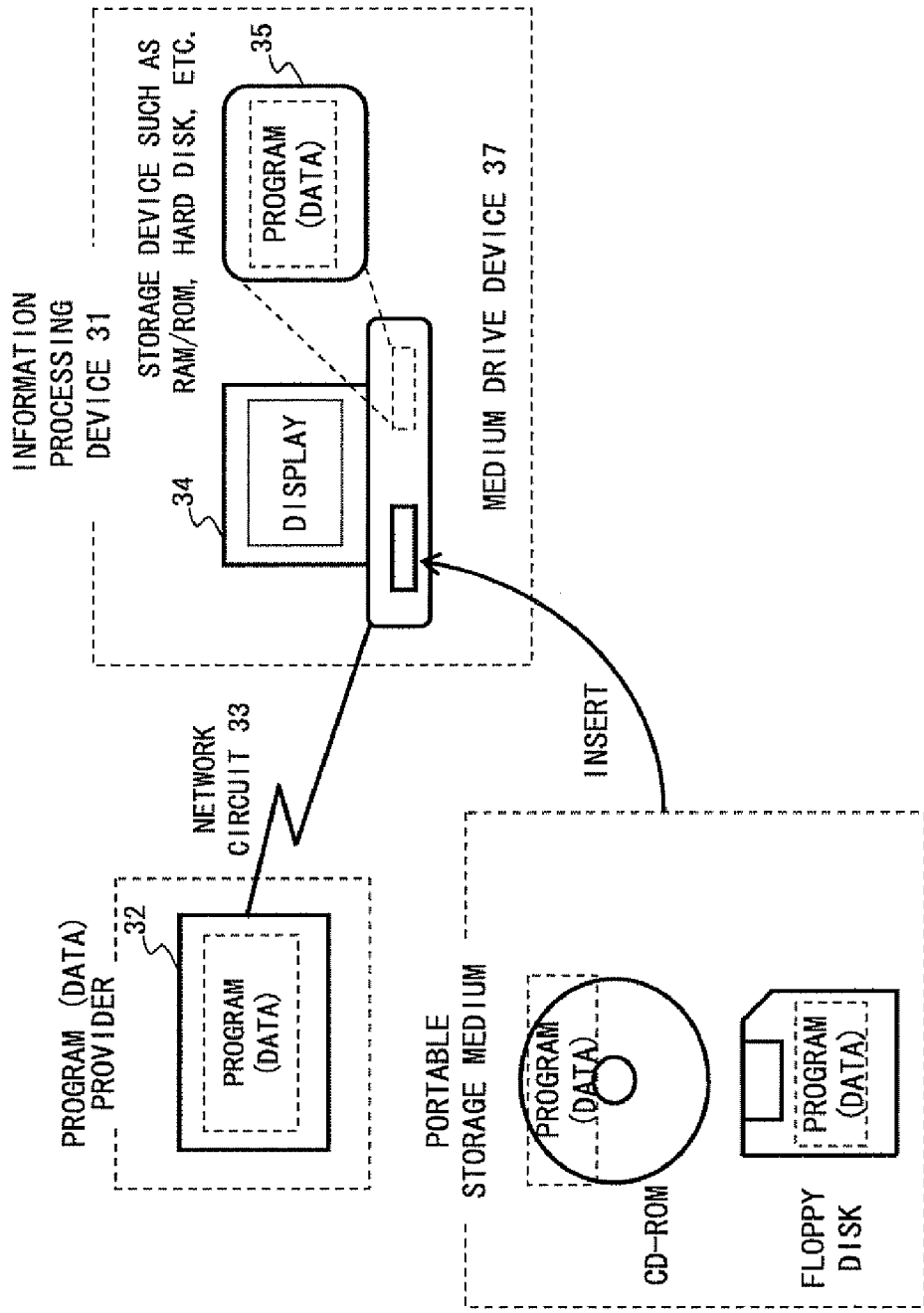
FIG. 12 shows an example of a storage medium.

In this case, the "storage medium" includes a portable storage medium 36 removable from a medium drive device 37 such as CD-ROM, a flexible disk (or an MO, a DVD, a removable hard disk, etc.), etc., a storage unit (database, etc.) 32 in an external device (server, etc.) transmitted via a network circuit 33, memory (RAM, hard disk, etc.) 35 in a body 34 of an information processing device 31, etc. as shown in FIG. 12. The program stored in the portable storage medium 36 and the storage unit (database, etc.) 32 is loaded into the memory (RAM of hard disk, etc.) 35 in the body 34, and then executed.

In addition to the examples described above, for example, various large-capacity storage media including next-generation optical disk storage media using a blue laser such as Blu-ray Disc®, AOD (advanced optical disc), etc., an HD-DVD 9, a blue laser DVD, etc. using a blue purple laser can be used as the storage media such as the above-mentioned CD-ROM, DVD-ROM, etc. in embodying the present invention.

What is claimed is:

1. An information processing device, comprising:
   a power-off detection unit to detect a signal relating to a power-off operation of a user; and
   a processing unit including:
      an application program termination unit to terminate a predetermined application program from among a plurality of activated application programs when the power-off operation is performed;
      a control unit to pass control, after the termination of the application program, to a state in which an electric current is not supplied to the processing unit, normal execution can be started faster than normal power-off, and power consumption is lower than in the normal execution; and
      an application program activation unit to start a predetermined application program before the control unit passes control to the state.

2. The device according to claim 1, wherein
   a power supply state indicator is turned off when control is passed to the state.

3. The device according to claim 1, wherein
the control unit performs a normal terminating process when the user performs a power-off operation different from said power-off operation.

4. The device according to claim 1, wherein
the control unit restarts an Operating System after terminating the application program and before entering the state.

5. A power supply control method for an information processing device, comprising:
- detecting a signal relating to power-off operation of a user;
- terminating a predetermined application program from among a plurality of activated application programs when the power-off operation is performed;
- passing control to a state in which an electric current is not supplied to a processing unit in the information processing device, normal execution is started faster than normal power-off, and power consumption is lower than in the normal execution after terminating the application program; and
- starting a predetermined application program before passing control to the state.

6. The method according to claim 5, wherein
a power supply state indicator is turned off when control is passed to the state.

7. The method according to claim 5, wherein
The control step performs a normal terminating process when a power-off operation different from said power-off operation is received.

8. A non-transitory computer-readable storage medium storing a program used to direct a computer to perform:
- detecting a signal relating to power-off operation of a user;
- terminating a predetermined application program from among a plurality of activated application programs when the power-off operation is performed;
- passing control to a state in which an electric current is not supplied to a processing unit in the computer, normal execution is started faster than normal power-off, and power consumption is lower than in the normal execution after terminating the application program; and
- starting a predetermined application program before passing control to the state.

* * * * *